Patented June 23, 1942

2,287,042

UNITED STATES PATENT OFFICE 2,287,042

RAT-PELLAGRA PREVENTING COMPOUNDS AND PROCESSES FOR THEIR PRODUCTION

John C. Keresztesy, Rahway, and Joseph R. Stevens, Plainfield, N. J., assignors to Merck & Co. Inc., Rahway, N. J., a corporation of New Jersey No Drawing. Application January 3, 1938, Serial No. 183,138

5 Claims. (Cl. 260—297)

The present invention relates to the production of a crystalline chemical compound heretofore unknown as a chemical entity, possessing the physiological property of preventing "rat-pellagra," and methods for its extraction and isolation from natural products.

The substance in question is of a vitamin character and is believed to be present in minute quantities in some form of combination or admixture in a rather extensive class of food stuffs, including such as rice-bran, yeast, milk, meat, liver, fish, etc.

Paul György first reported the presence of a "rat-pellagra" preventing factor in a yeast preparation. He characterized this unknown factor by its physiological action, in "Nature" (1934, vol. 133, p. 498) and provisionally designated it as "vitamin B-6." Györygy has traced the presence of this otherwise undefined vitamin principle in some of the food-stuffs named, by the fact that certain deficiency symptoms in rats were prevented by administration of varying amounts of certain food-stuffs and of extracts from such food-stuffs.

The potency of such various extracts varies considerably and they are roughly standardized by the degree of physiological response effected by measured quantities of the given concentrate.

For the purpose of the present specifications, when reference is made to a rat-curative unit, it relates to the amount of material which, when given in a single dose, will effect a cure or manifest a marked degree of alleviation of symptoms and stimulation of growth within two weeks after administration to a rat which had developed marked deficiency symptoms as described by György (Biochem. J., 29, 741).

Rice-bran has been a convenient source for the extraction of various vitamins and related principles. The concentrates of the acidulated water extractions of the bran have been used for the study and production of various of such principles, as for instance, vitamin $B_1$.

These various concentrates were found to contain a highly complex mixture of many substances comprising purin bases, choline bases, sugars, and a large variety of other substances such as primary, secondary, tertiary and quarternary bases, not clearly defined, as well as many acidic substances, such as nicotinic acid, and proteins.

Depending upon their source and the manner of their production, they were naturally widely divergent as to their ultimate composition, and it was, therefore, necessary to standardize them as to any given curative value, generally expressed in terms of rat units, when employed in their form as concentrates.

The applicants undertook to isolate the specific vitamin principle, which is the "rat-pellagra preventative" factor defined by György (supra), from the complex of materials found in the concentrates as above described, and to characterize the same. This they have now succeeded in accomplishing as will further appear herein.

For convenience of description, the new isolated substance will be referred to as "vitamin $B_6$" or the "active principle."

We have found that a suitable material for the purpose of isolating vitamin $B_6$ can be obtained by extracting rice bran with acidulated water, adsorbing the active principle on fuller's earth and eluting it therefrom by methods similar to those reported by Williams et al. for the isolation of vitamin $B_1$. Of course, it is possible to prepare a suitable starting concentrate by other means obvious to those skilled in the art.

In the process for isolating the new substance, one step consists of treating an appropriate concentrate, of the kind heretofore described, with acid and with alkali, and is concerned with the removal from, and chemical modification of, some of the "inactive" or "foreign" materials. "Inactive" or "foreign" material, in the sense of the instant application, includes all such substances which are inactive per se or which are physiologically active in another direction, such as for instance vitamin $B_1$, nicotinic acid, lactoflavin, and other principles, as distinguished from the specific vitamin $B_6$ principle described herein.

A further step of separation is concerned with the removal of the inactive and/or modified materials by extraction with appropriate solvents and the subsequent separation of our "active" material from such other "inactive" materials.

Another step consists of acylation and the subsequent separation of the desired acylated vitamin principle from foreign and other "inactive" or altered material by appropriate extraction, as with chloroform, for instance.

Thereupon, there follows a precipitation of the active principle with a suitable nitrogen base precipitating agent, such as phosphotungstic acid, and the final crystallization of the principle in the form of a hydrohalide salt.

In case the active principle is to be isolated from extracts derived from natural products other than rice bran, the general steps above outlined may be further modified or supplemented by the precipitation of inactive material with ethyl nitrite and/or by a destruction by oxidation with mild oxidizing agents such as 10% nitric acid.

By way of more specific illustration of the methods for producing the new substance, certain preferred methods of effecting the several steps and objectives as above broadly outlined, will now be illustrated.

A. Elimination of "inactive" or "foreign" materials by acid

We have found that a large amount of "inactive" material can be removed by means of an acid treatment, be it that insoluble compounds are formed which can be filtered off or that simple hydrolysis products are produced, which differ from their parent substances in their solubility relationships, so that they can be removed by means of solvents in subesquent steps. Examples of preferred methods of practicing this step are presented by way of illustration:

(1) 500 grams of the original concentrate are dissolved in water to a solution of two litres, 800 cc. of concentrated hydrochloric acid are added. This mixture containing approximately 10% HCl is then allowed to digest on a stream bath for sixteen hours. At the end of this time the reaction mixture is cooled and the insoluble material removed by filtration. In order to get the material in suitable form for further processing, the solution is neutralized with 30% sodium hydroxide and the resulting mixture concentrated under vacuum to a syrupy mass which is then exhaustively extracted with 95% ethyl alcohol. The alcohol extract is evaporated in vacuo to a syrup free from alcohol. By this treatment no significant loss of the active principle, vitamin $B_6$, is noted by means of the biological assay, whereas a substantial decrease in the foreign organic materials present is effected. The amount of purification resulting from this treatment obviously depends largely on the individual characteristics of the starting material; in this experiment it is approximately five-fold.

(2) Concentrated hydrochloric acid may be substituted for the 10% acid and the resulting mixture may be digested at 100° C., or can be actually boiled under reflux with no significant destruction of the active substance. We find that, if the acid is used at the higher concentrations, the amount of inactive material is decreased to an even lower level.

B. Elimination of "inactive" and foreign material by alkali

We have found also that many of the unwanted products can be removed by alkaline treatment without significant loss of vitamin $B_6$. We present an example of a preferred method for this purpose:

The product obtained from process "A" is diluted with water to effect solution. To this solution sufficient 30% sodium hydroxide is added to produce a solution containing 10% sodium hydroxide. This solution is then digested on a steam bath for about sixteen hours at 100° C. At the end of that time the reaction mixture is cooled and filtered and the filtrate neutralized with hydrochloric acid and evaporated in vacuo to a syrup. The resulting syrup is then exhaustively extracted with 95% alcohol and the alcohol extract evaporated to a syrup free of alcohol.

By this treatment some "inert" materials are removed and also other inactive materials converted into substances whose properties differ sufficiently from those of parent substances, so that they may be more easily removed in subsequent processes. In place of sodium hydroxide, other alkalis may be used, such as potassium, calcium, barium or strontium hydroxide.

C. Selective separation by means of solvents under special conditions

We have found that under special conditions an appreciable concentration of the vitaminic substance can be effected by the use of certain solvents. A preferred procedure which we have found effective follows:

The syrup obtained from step "B" is further concentrated to a thick gum in vacuo until it is practically free of water. This residue is then thoroughly extracted with hot absolute alcohol. This alcoholic solution on cooling deposits insoluble inactive material which is removed by filtration. The alcoholic extract is then evaporated to dryness on a sufficient quantity of sea sand under high vacuum with mild heating. The preparation dried on sand is then subjected to a series of exhaustive solvent extractions during which the sand preparation is ground with several volumes of the solvent until further extractions do not show additional removal of significant quantities of soluble materials.

The solvents we have used in our experiments are ethyl ether, chloroform and acetone, preferably used successively in this order. Biological assay of the resulting fractions indicates that the vitamin has been largely concentrated into the acetone extraction with a substantial reduction of the inert or "inactive" organic materials originally present.

The acetone extraction may be further purified by re-drying on sea sand under high vacuum, as before mentioned, and again subjecting the impregnated sand to repeated extractions with ether, chloroform and acetone. Again further purification is obtained as indicated by the reduction of the inactive materials present in the acetone fraction and the biological assay for vitamin $B_6$.

In place of sea sand it is possible to use other adsorbent materials, such as powdered glass, asbestos and other inactive materials, which will not form an adsorption complex with the active principle, while permitting the distribution of the material to be extracted on a large surface.

D. Purification through acylation

It has been claimed in the literature (Birch and György, Biochem. J. 30, 304) that, when a vitamin $B_6$ extract or solution is subjected to the action of benzoyl chloride in the presence of alkali, the resulting solution loses its vitamin $B_6$ potency.

We have found, however, that under special conditions we can convert vitamin $B_6$ to an acylated form from which we can recover the vitamin $B_6$ by hydrolysis in good yield. The vitamin $B_6$ per se, as well as most of the "impurities," are sparingly soluble in chloroform. We have found, however, that acylated vitamin $B_6$ is easily extractable from aqueous solution with chloroform even in the presence of dilute acid. This marked change in physical properties makes it possible to remove a large amount of "foreign" bodies. Our preferred method is to mix the water-free extract obtained under "C," containing small amounts of alcohol, with acetyl chloride at room temperature, followed by gentle refluxing and, after cooling, decomposing the reaction mixture with ice water, extracting the acylated product with chloroform, and recovering the vitamin B6 acylated product by evaporating the chloroform and hydrolyzing the residue with 5% caustic soda solution at steam bath temperature.

In the above example, acetyl chloride can be replaced by acetic anhydride or by the chlorides or anhydrides of other organic acids. The method of acylation will depend upon the acylating agent, solvent, etc.; such variations in procedure are well known to those skilled in the art.

E. Phosphotungstic acid precipitation

Phosphotungstic acid is widely used for the precipitation of nitrogen bases. It was reported by György (Biochem. J. 30, 304) that when this reagent was used on a concentrate of vitamin B6, a precipitate was obtained which contained the active principle along with many of the other nitrogen bases present in the concentrate. We have found that phosphotungstic acid precipitation, when applied at this point of our isolation process, is a useful step in the isolation of the active material in that a relatively large amount of foreign organic material, as well as the inorganic substances, introduced in previous steps, are not precipitated and, therefore, eliminated.

To further illustrate our method, the product obtained on the hydrolysis of the acylated vitamin B6 in step "D" is neutralized with sulfuric acid to a pH 7. To this solution there is then added first a solution of sodium phosphotungstate followed by dilute sulfuric acid to complete precipitation. The precipitate is allowed to stand over night at ice-box temperature and the precipitate thereafter separated from the supernatant liquor by centrifugation. It is then suspended in dilute sulfuric acid and re-centrifugated. This washed precipitate is dissolved in a small amount of acetone, separated from insoluble phosphotungstates, if any, and a solution of barium hydroxide added to attain a pH above 10. The mixture is then again centrifugated and the residue extracted about four or five times with baryta water. The combined baryta extracts are adjusted to a pH of 7 with sulfuric acid and the barium sulfate removed and washed. The sulfate ion can be removed from the combined filtrate and washings by the addition of a slight excess of barium chloride and the barium sulfate removed and washed. The resulting filtrate and washings are then evaporated to dryness in high vacuum and the dried residue repeatedly extracted with acetone. The "vitamin B6" is dissolved by the acetone and recovered on evaporation of the acetone.

The acetone concentrate obtained from step "E", free from acetone, is dissolved in a relatively small amount of absolute alcohol. To this alcoholic solution is then added a sufficient amount of alcoholic hydrochloric acid solution followed by acetone to a permanent cloudiness. On allowing this mixture to stand, a crystalline precipitate is obtained which, when separated from the mother liquor and recrystallized from alcohol or alcohol and acetone, appear as well defined crystalline platelets.

The physiological activity of this material was found to be greater than 10,000 curative rat units per gram. Further repeated recrystallizations from alcohol as above, or other solvent mixtures, such as water and alcohol or water and dioxane, do not increase the potency of the isolated substance. The product, the hydrochloride of the vitamin B6, is characterized as a white crystalline substance melting at about 204–206° C. with decomposition, freely soluble in water, slightly soluble in alcohol, almost insoluble in acetone, dioxane, ether, etc.

The following steps which are mentioned heretofore, although not usually found to be essential to the above process, but which can nevertheless at times be supplemented or substituted to advantage at some stages in the process, depending on convenience or the source of the concentrate to be used for extraction, are here described:

G. Ethyl nitrite for the removal of "inactive" material

It has been found that when ethyl nitrite is added to an alcoholic solution of a concentrate of vitamin B6, considerable amounts of inactive material can be precipitated and removed. If thereafter alcoholic hydrogen chloride is added in the cold, a further precipitate of inactive organic material is obtained. After three hours standing, the mixture is warmed to 40° C., cooled again in an ice bath and an equal volume of ether added which causes further precipitation. The mixture is filtered, the insoluble part washed with ether-alcohol mixture, the combined liquors are neutralized with caustic soda solution, filtered, and evaporated to a thick gum which contains nearly all of the active material.

H. Nitric acid oxidation

When an impure concentrate in ten percent nitric acid, containing some nitrous acid, is heated at steam bath temperature for two hours, a slow evolution of nitrogen oxides occurs. During this period a gradual decrease in the intensity of color results, giving further indication of oxidation or destruction of foreign matter, without appreciable loss in active principle as ascertained by biological assay. This treatment also effects purification in a manner similar to the acid treatment as explained under step "A."

The examples of the several steps as herein set forth are presented by way of illustration to enable those skilled in the art to practice the same by appropriate adaptation to various source materials, and the applicants do not intend to limit themselves to specific steps so exemplified.

Obviously the number and order of the steps, and solvents and materials employed, may be modified, within reasonable limits, in the practice of the invention as disclosed, without departing from the spirit and scope thereof.

We claim:

1. The process for isolating the rat-pellagra preventing vitamin principle from concentrates obtained from natural sources, which comprises steps for the destruction, modification, and removal of inactive material from such concentrates by treating the concentrates with mineral acids at an elevated temperature, removal of insoluble inactive matter by filtration, neutralization, evaporation, extraction with alcohol and removal of alcohol from the extract by distillation under reduced pressure; followed by a treatment with alkali at an elevated temperature, removal of insoluble inactive matter by filtration, neutralization, evaporation; extraction with alcohol and evaporation of the alcohol under reduced pressure, followed by drying onto sand, extracting with ether, chloroform and acetone; drying the acetone extract onto sand and repeating the extractions with ether, chloroform, and acetone; evaporating the final acetone extract, acylating the residue with an acylating reagent; extracting the acylated product with chloroform in the presence of water, evaporation of the chloroform extract, hydrolyzing the residue with dilute alkali and neutralizing; followed by precipitation with phosphotungstic acid, dissolving the precipitate in acetone, decomposing the phosphotungstic acid precipitate with barium hydroxide; removing barium phosphotungstate and the other insoluble barium salts, neutralizing, evaporating to dryness; extracting residue in acetone, evaporating the acetone, followed by dissolving in alcohol, acidifying with alcoholic hydrochloric acid; and precipitating the active principle by addition of acetone followed by repeated recrystallization from absolute alcohol.

2. The process for isolating the rat-pellagra preventing vitamin principle from concentrates obtained from natural sources which comprises preliminary modification and destruction of inactive ingredients by treatments with acids and with alkalis at an elevated temperature; selective partial separation of the unaltered active principle from the inactive materials remaining in the solutions after the said acid and alkali treatments by filtration; further treatment of the residues remaining in solution by acylation and the selective extraction of the acylated active principle with chloroform; hydrolysis of the acylated active vitamin principle; precipitation of the active principle restored by this hydrolization step and recrystallization of the active principle.

3. In the process of preparing crystalline vitamin $B_6$, the steps of treating a concentrate containing vitamin $B_6$, for the purpose of the destruction, modification, and removal of inactive material from such concentrate, with an aqueous solution of a mineral acid at an elevated temperature, neutralizing and evaporating the aqueous solution, followed by the removal of insoluble matter by filtration and by extraction with alcohol, removal of the alcohol from the extract by distillation, followed by treatment of the residue with an aqueous solution of an alkali at an elevated temperature, neutralizing and evaporating the aqueous solution, followed by removal of insoluble matter by filtration and by extraction with alcohol.

4. In the process of preparing crystalline vitamin $B_6$, the steps of treating a concentrate containing vitamin $B_6$, for the purpose of the destruction, modification, and removal of inactive material from such concentrate, with an aqueous solution of a mineral acid at an elevated temperature, neutralizing and evaporating the aqueous solution, followed by the removal of insoluble matter by filtration and by extraction with alcohol, removal of the alcohol from the extract by distillation, followed by treatment of the residue with an aqueous solution of an alkali at an elevated temperature, neutralizing and evaporating the aqueous solution, followed by removal of insoluble matter by filtration and by extraction with alcohol, evaporating off the alcohol, followed by drying onto sand, removing inert matter from the dried material by grinding with ether and chloroform, followed by removing the active principle by grinding repeatedly with acetone.

5. In the process of preparing crystalline vitamin $B_6$, the steps for treating a concentrate containing vitamin $B_6$, for the purpose of the destruction, modification, and removal of inactive material from such concentrate, with an aqueous solution of a mineral acid at an elevated temperature, neutralizing and evaporating the aqueous solution, followed by the removal of insoluble matter by filtration and by extraction with alcohol, removal of the alcohol from the extract by distillation, followed by treatment of the residue with an aqueous solution of an alkali at an elevated temperature, neutralizing and evaporating the aqueous solution, followed by removal of insoluble matter by filtration and by extraction with alcohol, evaporating off the alcohol, followed by drying onto sand, removing inert matter from the dried material by grinding with ether and chloroform, followed by removing the active principle by grinding repeatedly with acetone, treating the active principle with an acylating agent in the absence of water at refluxing temperature, extracting the reaction mixture with chloroform in the presence of ice water, followed by evaporation of the chloroform solution and saponification of the residue with dilute alkali.

JOHN C. KERESZTESY.
JOSEPH R. STEVENS.